Feb. 10, 1970   R. REYNARD ET AL   3,494,211
PULLEY WITH VARIABLE RADIUS OF CURVATURE FOR FLEXIBLE
LINE, PARTICULARLY FOR FLEXIBLE DRILL PIPE
Filed June 28, 1968   3 Sheets-Sheet 1
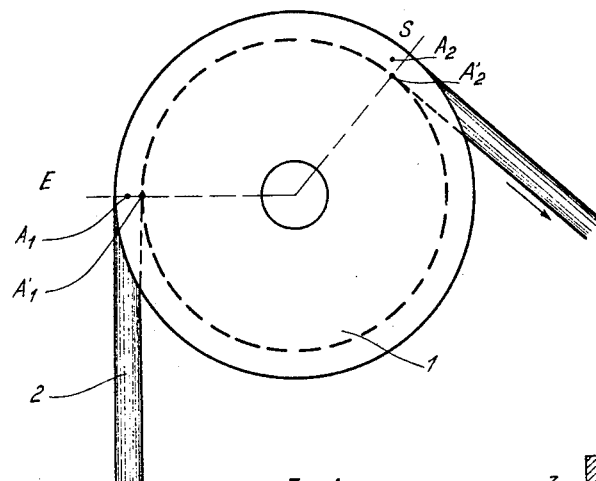
Fig.1
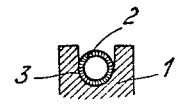
Fig.1A
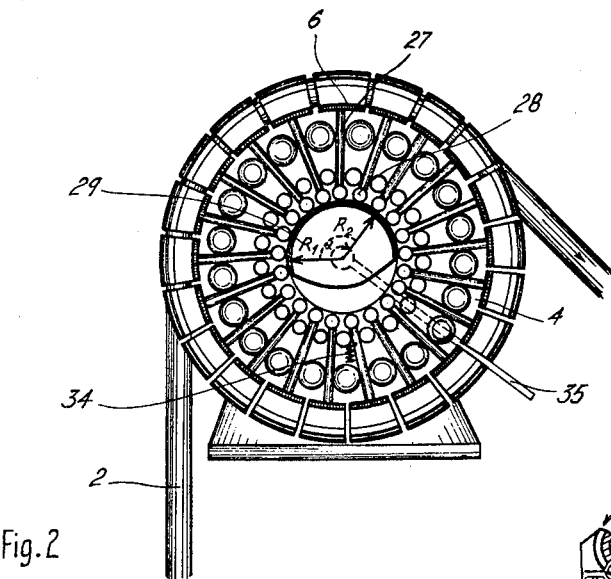
Fig.2
Fig.2A
INVENTORS
REMI REYNARD
JEAN THIERY
ROGER TINDY
BY
Craig & Antonelli
ATTORNEYS

INVENTORS
REMI REYNARD
JEAN THIERY
ROGER TINDY

INVENTORS
REMI REYNARD
JEAN THIERY
ROGER TINDY
BY
ATTORNEYS

United States Patent Office 3,494,211
Patented Feb. 10, 1970

3,494,211
PULLEY WITH VARIABLE RADIUS OF CURVATURE FOR FLEXIBLE LINE, PARTICULARLY FOR FLEXIBLE DRILL PIPE
Remi Reynard, Montesson, Jean Thiery, Le Pecq, and Roger Tindy, Bougival, France, assignors to Institut Francais du Petrole des Carburants et Lubrifiants, Rueil Malmaison, Hauts-de-Seine, France
Filed June 28, 1968, Ser. No. 741,137
Claims priority, application France, June 29, 1967, 112,551
Int. Cl. F16h 55/54
U.S. Cl. 74—230.24                                   7 Claims

ABSTRACT OF THE DISCLOSURE

Pulley for an elastic flexible line, having a radius of curvature which progressively decreases from the inlet of the pulley, where the load applied to the line is the highest, to the outlet of this pulley.

---

Figure 3:
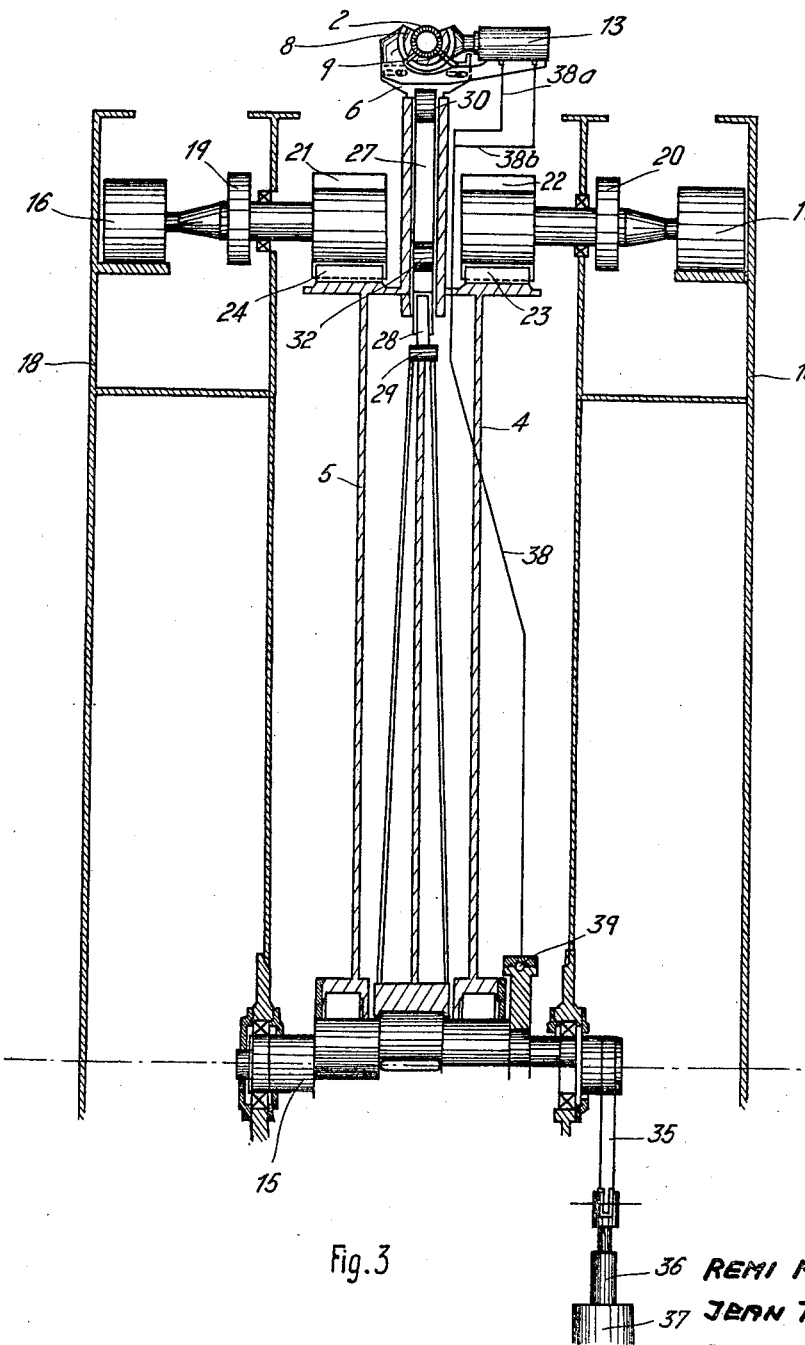

The present invention relates to a pulley for a flexible line, such as, for example, a flexible pipe, this pulley being advantageously provided at its periphery with clamping or gripping means, so as to be adapted for continuously drawing the flexible line.

With conventional grooved pulleys, a flexible line is subjected, under the action of a load applied to this line and resulting in particular from its own weight, to a compressive force against the bottom of the groove of the pulley. This radial compressive force varies from a maximal value at the inlet of the pulley, this maximal value being the greater, for a given load applied to the flexible line, as the radius of the pulley is the smaller, to a value which may be very small at the outlet of the pulley.

This phenomenon is particularly troublesome when the flexible line passing on the pulley is a pipe, the resistance of which to compression is, because of its hollow section, necessarily more limited than that of a cable.

Moreover, whether this flexible line is a pipe or a cable, its elasticity and the progressive decrease in the load applied to the line from the inlet to the outlet of the pulley result in a relative displacement or creeping of the line relatively to the pulley, this creeping causing an important wear of the external coating of the flexible line.

The degree of wear caused by this relative sliding increases with the pressure of the line against the groove of the pulley and is a function of the respective surface roughness of the flexible line and of this groove. A low coefficient of friction which could permit to reduce this wear, is however hardly compatible with a sufficiently high coefficient of adherence of the flexible line on the groove of the pulley to provide for an effective traction of the line.

Accordingly, a first object of the invention is to provide a pulley permitting a substantially uniform distribution of the compression stresses along a flexible line sheaved over this pulley, from the inlet to the outlet of the pulley.

A second object of the invention is to eliminate, or at least to limit, the phenomenon of creeping of the flexible line over the groove of the pulley from the inlet to the outlet thereof.

An additional object of the invention is to eliminate, or at least to limit, the phenomenon of creeping of the flexible line over the groove of the pulley from the inlet to the outlet thereof.

An additional object of the invention is to provide a driving pulley capable to perform by itself the traction of a flexible line, so as to unreel it from a storing winch or to wind it up around such a winch.

According to the invention, these objects are achieved with a pulley for a flexible line, such as in particular a flexible pipe, this pulley having a variable radius of curvature which decreases from the inlet to the outlet of the pulley.

In a particular embodiment of the invention, this pulley includes two flanges which are rotatably mounted around an axis carried by a frame and limit between each other a passage for the flexible line, means being provided to rotate said flanges around said axis, this pulley including a plurality of rim sections having a rectilinear or, preferably, slightly incurved sectors, for example circular, for receiving said flexible line, these rim sections being optionally associated with means for gripping said flexible line and integral with support members displaceable along a radial direction with respect to said axis, said support members cooperating with a cam carried by the same axis and occupying an adjustable fixed position with respect to said frame, said cam having a radius which progressively decreases from the inlet to the outlet of the pulley, said support members bearing on said cam by means of roller means.

The spacing between adjacent rim sections will obviously be selected large enough to permit their radial displacement toward the axis, this displacement bringing them closer to each other.

Figure 4:
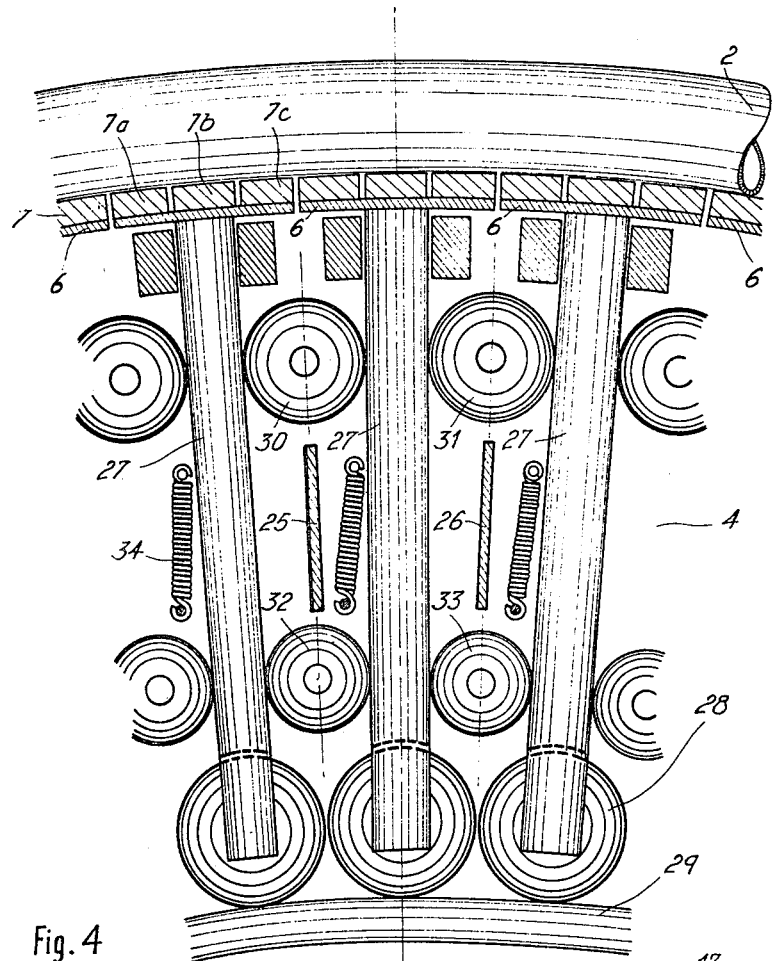
Figure 4A:
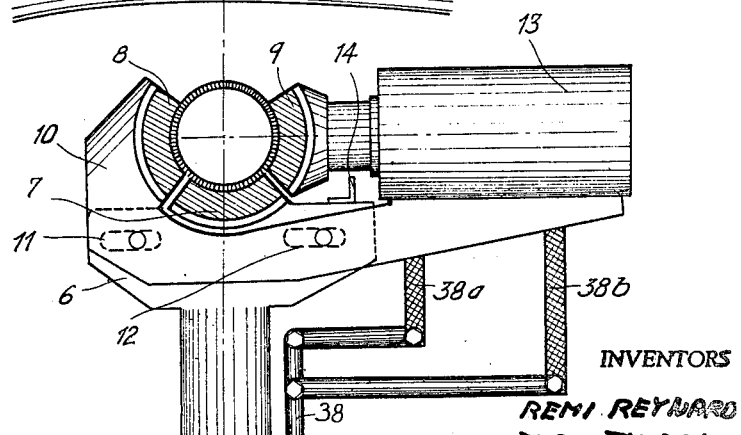

A non limitative embodiment of the invention will be described hereinafter in detail with reference to the attached drawings, wherein:

FIGURES 1 and 1A are two diagrams illustrating the drawbacks of conventional grooved pulleys FIGURES 2 and 2A are two diagrammatic illustrations of an embodiment of the invention FIGURE 3 is an axial half section of a pulley according to the invention FIGURE 4 is a partial view on a larger scale, showing the rim sections integral with slidable radial support members, FIGURE 4A illustrates the means for gripping the flexible line, provided on each rim section in this embodiment.

In FIGURE 1, the reference numeral 1 designates a grooved pulley of a conventional design around which passes a flexible pipe 2 such as a flexible drill pipe, subjected to tractive stresses resulting in particular from its own weight. These stresses result in a compression of the pipe against the bottom of the groove 3 of the pulley (FIGURE 1A).

This compression leads to a flattening of the pipe, and this the more as the fibers of this pipe most remote from the pulley axis are put under tension, as a result of the curvature of the pulley, the tendency to compression, which results from the traction exerted by the pulley being thus the more increased as the radius of the pulley is smaller.

The compressive stresses applied to a flexible drill pipe may thus reach values ranging from some tens kg./cm.$^2$ to about one hundred kg./cm.$^2$, for loads of some hundred tons applied to the pipe and for a radius of curvature of the pulley relatively small, for example of the order of one meter and for a diameter of the cross-section of the groove of the pulley of about 10 cm.

Moreover the flexible cables or pipes have a certain longitudinal elasticity, for example the elastic elongation under a load is of about 1% per 100 tons of load, and, since the load supported by the pipe progressively decreases from the inlet E of the pulley 1 to its outlet S, the flexible is subjected to a progressive retraction between the inlet and the outlet of the pulley: while a point $A_1$ of the pipe is displaced to $A_2$, the point $A'_1$ of the groove of the pulley facing $A_1$ has been displaced to the position $A'_2$ located ahead of the point $A_2$ (since the pulley may be considered as not elastic as compared with the pipe).

This relative sliding or creeping of the flexible pipe over the pulley may reach several centimeters in the case of a flexible drill pipe, for a pulley with a diameter of about 8 meters receiving the flexible pipe over an arc of about 130°, which can lead to a fast wear of the pipe skin if there is selected a coefficient of friction between the pipe and the pulley groove providing for a sufficient adherence.

The pulley according to the invention does not exhibit the above-indicated drawbacks.

An embodiment of this pulley is diagrammatically illustrated by FIGURES 2 and 2A and more completely by the following figures, the same reference numerals being used in the different drawings to designate the same elements.

This pulley is provided with two flanges 4 and 5 only one of which has been indicated in FIGURE 2, while the other one does not appear in the drawing so as to better show the arrangement of the different elements of the pulley between these flanges.

The pulley according to the invention also includes a plurality of rim sections 6 having the shape of rectilinear or incurved sectors, for example circular, provided with means for gripping or clamping the pipe by a compression of the latter in a direction parallel to the axis of the pulley.

In the illustrated embodiment (FIGURES 2A and 4A), this gripping means includes an assembly of three gripping shoes, each of which covers a circular sector of the cross section of the pipe, and which are provided with a suitable resilient coating, made for example of an elastomer, on their surfaces in contact with the pipe.

In each rim section (FIGURE 4A), one of the gripping shoe, such as the shoe 7, is integral with the rim section. The two other shoes (shoes 8 and 9) have diametrically opposed locations with respect to the pipe. One of them is integral with a half-jaw 10 which is movable in a direction parallel to the pulley axis, along the two slots 11 and 12 provided in the rim section 6.

The third shoe 9 is integral with the piston rod of a reversible hydraulic jack, the cylinder 13 of which is secured to the half-jaw 10. A stop 14 on the rim section 6 limits the axial displacement of the cylinder 13 actuating the shoe 8, thereby dividing the transverse gripping force between the two shoes 8 and 9.

The clamping by the shoes of the different rim sections is effected exclusively on that part of the pulley over which the pipe 2 is sheaved, in a manner to be described hereinunder.

The resilient coating of each shoe will advantageously be divided into a plurality of elements such as 7a, 7b, 7c (FIGURE 4) separated by short intervals so as to facilitate the contractions or elongations of the successive parts of the pipe.

The clamping of the pipe effected by the lateral shoes such as 8 and 9 with substantially equal pressures all along the section of pipe sheaved over the pulley, has an action counteracting the effect of compression of the pipe against the bottom of the pulley rim, thereby providing a more regular distribution of the pressure of application of the pipe against the bottom of the shoes, such as the shoe 7 (FIGURE 4A).

Under these conditions the radial crushing of the pipe, which is maximal at the inlet of the pulley, as hereinabove indicated, is considerably reduced.

The flanges 4 and 5 of the pulley are mounted idle on a shaft 15 (FIGURE 3), the axis of which is that of the pulley, and in the illustrated embodiment these flanges are driven in rotation by a set of hydraulic motors, such as the motors 16 and 17 (these motors may be in any number).

The rotation is effected through reducing gears 19, 20, by means of pinions 21 and 22 in mesh with toothed rims 23 and 24 provided at the periphery of the flanges 4 and 5 respectively.

These flanges are made integral with each other by means of cross members such as 25 and 26 (FIGURE 4).

The rim sections 6 are secured to radial support members 27 which at their lower ends bears through rollers 28 on the profile of a cam 29, the shape of which will be specified hereinunder. This cam is keyed on the shaft 15 and is therefore not driven in rotation together with the flanges 4 and 5.

The support members 27 of the rim sections are maintained radially in their respective angular locations, between the flanges 4 and 5, by means of guide rollers such as the rollers 30 to 33 (FIGURE 4) having axes secured to these flanges, which provides for axial sliding of each of the support members 27.

Springs 34, connecting the support members 27 with the flanges, hold these support members when the corresponding rim sections 6 reach their lower position, during the rotation of the flanges of the pulley.

According to the invention, the cam 29 is provided with a radius of curvature which decreases progressively from the inlet to the outlet of the pulley between two values $R_1$ and $R_2$ respectively. These values are so selected that the contraction of the pipe, as a result of the progressive decrease in the tension of this pipe from the inlet to the outlet of the pulley, can be compensated for as exactly as possible by a corresponding shortening of the circumference of the pulley, resulting itself from a progressive decrease of the pulley radius which suppresses the relative sliding or creeping of the pipe along the rim of the pulley (FIGURE 2).

The profile of the cam will therefore have the shape of a spiral having a radius decreasing from the inlet to the outlet of the pulley, in the direction of progression of the pipe.

The values $R_1$ and $R_2$ will thus be such that the difference $R_1$–$R_2$ corresponds to the contraction which the pipe would be subjected to along the angular sector of the pulley which the pipe covers, this contraction being proportional to the load applied to the pipe at the inlet of the pulley. In practice, the difference $R_1$–$R_2$ complying with the above-indicated condition will not exceed a few percent of the radius of the pulley. With the scale of FIGURE 2 this difference is much too small to be apparent. As the load applied to the pipe varies with the time, particularly as a function of the unreeled length of the pipe, the value of the difference $R_1$–$R_2$ of the cam radii, corresponding respectively to the inlet and to the outlet of the pulley, may be adjusted by varying the angular setting of this cam with respect to the frame carrying this cam, by pivoting the cam, for example by means of a crank-rod system 35–36 (FIGURES 2 and 3) actuated by a hydraulic jack 37. This adjustment may be effected either discontinuously or stepwise, as the pipe is wound up or unreeled. It will also be possible to provide for a continuous adjustment by automatically actuating the crank-rod system 35–36 as a function of the load exerted on the pipe at the inlet of the pulley.

The cylinders 13 of the jacks for actuating the lateral clamping shoes 8 and 9 are supplied with hydraulic fluid through pipes or hoses such as 38a and 38b, opening out on each side of the jack piston and connected by means of pairs of pipes 38 with a rim 39 providing a rotary connection for fluid distribution at the periphery of the shaft 15.

The control of the actuation of the jacks, as a function of their angular position around the pulley axis, during the rotation of this pulley (closing or opening of the lateral clamping shoes 8 and 9), will be provided by means of a hydraulic distributing device which may be of any known suitable type associated with the distributing rim 39.

Numerous changes in or additions to the above-described embodiment may be made without departing from the scope of the present invention.

For example, the control of the clamping of the pipe by the gripping shoes at the inlet of the pulley and of the opening of these shoes at the outlet may also be effected by means of control arms actuated by a cam which is distinct from the cam 29.

In order to control the progressive radial displacement of the rim sections 7a, 7b . . . etc., it will also be possible, instead of using a cam 29 on which the radial support members 27 bear, to constitute each of these support members of two parts slidable with respect to each other, the relative displacement of these two parts being hydraulically controlled as a function of the rotation of the pulley.

We claim:

1. Pulley for a flexible line subjected to a load which decreases from the inlet to the outlet of said pulley, said pulley having a profile the radius of curvature of which progressively decreases from the inlet to the outlet of the pulley.

2. Pulley in accordance with claim 1, wherein shoes are provided, for laterally clamping said flexible line with a substantially constant pressure, said shoes covering portions of walls of said flexible line which have diametrally opposed locations and being associated with means for controlling the clamping action of these shoes at the inlet of the pulley and releasing said clamping action at the outlet of said pulley.

3. Pulley in accordance with claim 1, including a stationary guide-track receiving said flexible line, said guide track having a radius of curvature which progressively decreases from the inlet to the outlet of the pulley.

4. Pulley in accordance with claim 1, including means for driving said flexible line said means being adapted for continuously drawing said line.

5. Pulley for a flexible line subjected to a load which decreases from the inlet to the outlet of this pulley, including a frame, at least a flange rotatably mounted around an axis carried by said frame, means for rotating said flange, a plurality of rim sections for receiving said flexible line, said rim sections being integral with support members which are radially displaceable with respect to said axis, and a cam coaxial with said flange, the angular position of which is fixed with respect to said frame and on which bear said support members by means of rollers, said flange being provided with means for guiding the radial displacements of said support members.

6. Pulley in accordance with claim 5, wherein the angular position of said cam is adjustable with respect to said frame.

7. Pulley in accordance with claim 6, including means for continuously adjusting the angular position of said cam, as a function of the variation of the load applied to the flexible line at the inlet of the pulley.

References Cited

UNITED STATES PATENTS

| | | | |
|---|---|---|---|
| 1,835,972 | 12/1931 | Schurig | 74—230.24 |
| 2,076,687 | 4/1937 | Vogel | 74—230.24 |
| 2,253,386 | 8/1941 | McCormick | 74—230.24 XR |
| 2,290,924 | 7/1942 | Watson | 74—230.24 XR |
| 2,752,797 | 7/1956 | Sherwin | 74—230.24 |

FRED C. MATTERN, Jr., Primary Examiner

J. A. WONG, Assistant Examiner

U.S. Cl. X.R.

74—230.23